United States Patent
Lewis

Patent Number: 5,182,876
Date of Patent: Feb. 2, 1993

[54] BALANCED JIGGING LURE

[76] Inventor: Earl L. Lewis, 3840 Keokuk, St. Louis, Mo. 63116

[21] Appl. No.: 712,478

[22] Filed: Jun. 10, 1991

[51] Int. Cl.⁵ ............................................. A01K 85/00
[52] U.S. Cl. .................................. 43/42.39; 43/42.09
[58] Field of Search .................. 43/42.09, 42.39, 42.23

[56] References Cited

U.S. PATENT DOCUMENTS

| | | | |
|---|---|---|---|
| 1,601,292 | 9/1926 | Burns . | |
| 1,606,078 | 11/1926 | Jordan . | |
| 1,657,966 | 1/1928 | Jordan . | |
| 1,833,581 | 11/1931 | Jordan . | |
| 2,795,076 | 6/1957 | Luft | 43/42.39 |
| 3,492,754 | 2/1970 | Jentzsch | 43/42.09 |
| 3,500,576 | 3/1970 | Ostrom | 43/43.12 |
| 3,546,804 | 12/1970 | Woolums | 43/42.11 |
| 3,742,639 | 7/1973 | Butts | 43/42.39 |
| 3,868,784 | 3/1975 | Sabol | 43/42.39 |
| 4,294,031 | 10/1981 | Manno | 43/43.16 |
| 4,619,067 | 10/1986 | West | 43/42.09 |
| 4,742,639 | 5/1988 | Gunn | 43/42.39 |
| 4,777,758 | 10/1988 | Phillips | 43/42.09 |
| 4,819,366 | 4/1989 | Manno | 43/42.39 |
| 4,862,629 | 9/1989 | Ryan | 43/42.39 |
| 4,862,632 | 9/1989 | Kattenberg | 43/43.16 |

Primary Examiner—Kurt C. Rowan
Attorney, Agent, or Firm—Grace J. Fishel

[57] ABSTRACT

A balanced jigging lure with a T-shaped shank on which weighted head and a barbed end section are balanced about a pivot point formed by the stem of the shank. Balance between the weighted head and the barbed end section is established by varying the length of the arms of the T-shaped shank, by selecting the weighted head and by selecting the barbed end section including any dressings and baits attached thereto.

3 Claims, 2 Drawing Sheets

BALANCED JIGGING LURE

The present invention relates to a jigging lure with a T-shaped shank about which a weighted head and a barbed end section are balanced.

BACKGROUND OF THE INVENTION

A jigging lure is an artificial lure consisting of a metal head, usually formed of lead, molded on the shank end of a hook. Jigging lures come in different shapes and sizes, usually with a dressing or a skirt of hair, feathers, nylon, rubber or plastic to conceal the barbed end section of the hook. Other jigging lures have no skirt or other dressing and are fished with an artificial or live bait.

Some jigging lures are designed to look like something good to eat from the fish's standpoint. Others look like nothing on this earth; whether the fish mistake them for food or strike them out of curiosity or anger is not known.

A conventional jigging lure can be cast and retrieved, trolled or jerked up and down vertically. Because the fishing line is attached to an eye on the metal head, jigs always ride head down with the hook facing up. This provides some degree of immunity to snags.

An expert fisherman who knows fish habits will often catch more and bigger fish on a jigging lure than an ordinary angler. Such a fisherman knows which jigging lure to use for a certain kind of fish, whether to attach a skirt or an artificial or live bait, which water and depth it is designed for, and how to manipulate it to provoke a fish to strike. To accomplish all of that, most expert fisherman carry a large assortment of jigging lures to meet the range of conditions encountered.

SUMMARY OF THE INVENTION

A principal feature of the present invention is to provide a balanced jigging lure for attachment to a fishing line used by a fisherman to catch a fish. In main part, the jigging lure has a T-shaped shank, a weighted head and a barbed end section.

The T-shaped shank has first and second arms and a stem. The stem has first and second ends. The first end is attached to the arms with a means for connecting the stem to the arms and the second end terminates in an eye to which the fishing line can be attached. The means for connecting the stem to the arms forms a pivot point about which the jigging lure can be suspended by the eye in the stem in a position imitative of a baitfish.

The weighted head is connected to the first arm and the barbed end section is attached to the second arm. The weighted head and the barbed end section are balanced about the pivot point. This can be accomplished by selecting the length of the arms, by selecting the weighted head and by selecting the barbed end section including any dressings and baits attached to the barbed end section. This selection allows the fisherman to form a large assortment of imitative jigging lures by interchanging the various parts.

An important object of the present invention is to provide a jigging lure which is imitative of a baitfish.

Another important object is to provide a jigging lure which allows the fisherman (particularly the expert fisherman) to form a large assortment of different jigging lures that are customized to meet the range of fishing conditions encountered and to catch more and bigger fish.

Other objects and features of the invention will be in part apparent and in part pointed out hereinafter.

The invention accordingly comprises the constructions hereinafter described, the scope of the invention being indicated by the subjoined claims.

BRIEF DESCRIPTION OF THE DRAWINGS

In the accompanying drawings, in which several of various possible embodiments of the invention are illustrated, corresponding reference characters refer to corresponding parts throughout the several views of the drawings and in which.

DETAILED DESCRIPTION OF THE INVENTION

Figure 1:
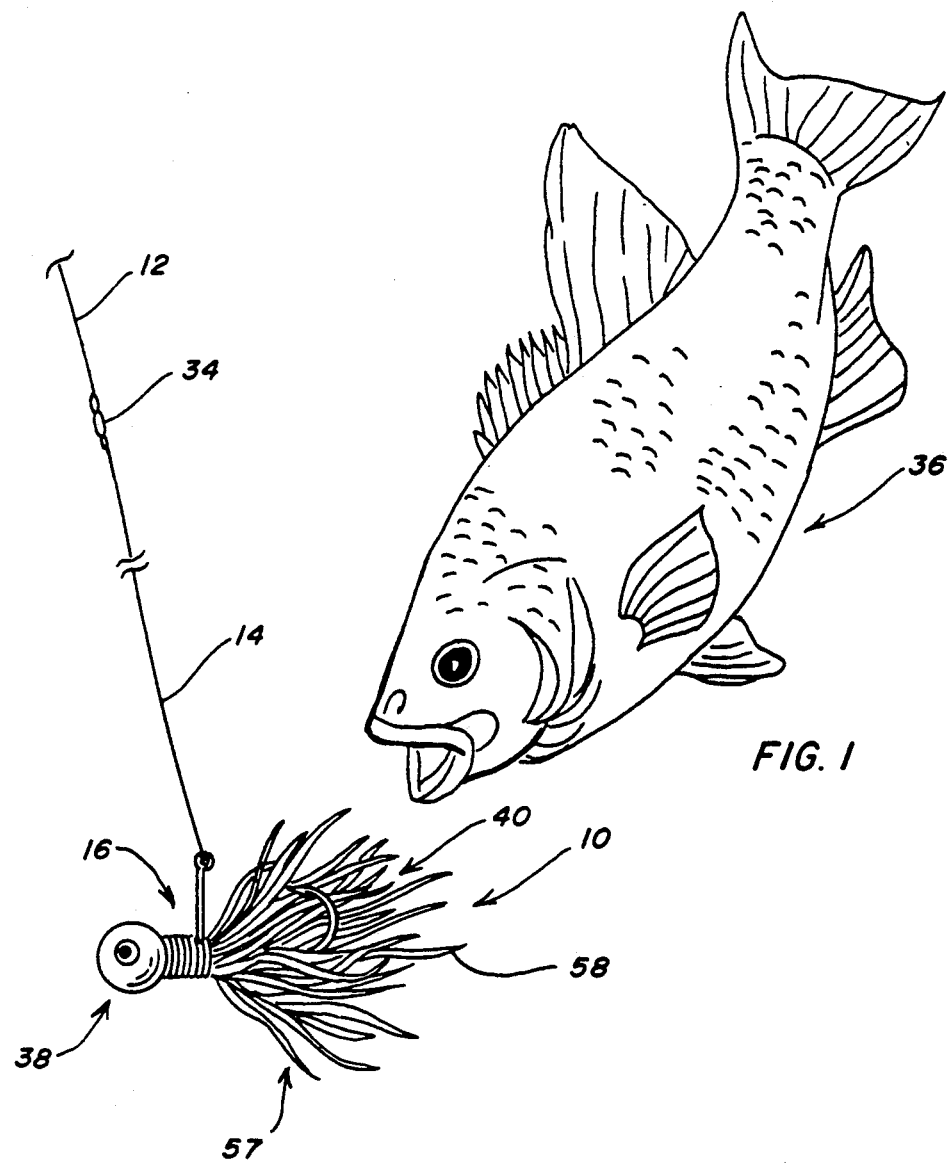
FIG. 1 is a perspective view of a balanced jigging lure in accordance with the present invention in the process of being struck by a fish.

Referring to the drawings, and in particular to FIG. 1, a balanced jigging lure 10 in accordance with the present invention is shown attached to a fishing line 12 by a leader 14. Fishing line 12 is attached to a fishing pole (not shown) operated by a fisherman (not shown).

Jigging lure 10 includes a T-shaped shank 16 having arms 18, 20 and a stem 22. Stem 22 has first and second ends 24, 26 and a means 28 for connecting the first end of the stem to the arms. In some instances, arms 18, 20 are integral and means 28 comprise a weld. In other instances when arms 18, 20 are integral, means 28 comprise a clutch that firmly grips the arms but which is movable under firm finger pressure. When means 28 are movable, the relative length of arms 18, 20 can be changed.

Second end 26 of stem 22 terminates in an eye 30 through which fishing line 12 is attached. Means 28 for connecting the stem to arms 18, 20 forms a pivot point about which jigging lure 10 is suspended on fishing line 12 in substantially horizontal position imitative of a baitfish.

With continuing reference to FIG. 1, stem 22 is elongated in the form illustrated and eye 30 is spaced a substantial distance above arms 18, 20. Leader 14 is connected to fishing line 12 through a swivel 34 (snap or other connector). It will be understood that leader 14 and swivel 34 can be omitted and that fishing line 12 can be tied directly to eye 30. Leader 14 is used primarily to disguise or reduce the visible attachment of fishing line 12 or as a safety measure to prevent a fish (such as bass 36 in FIG. 1) from biting through the line.

Figure 2:
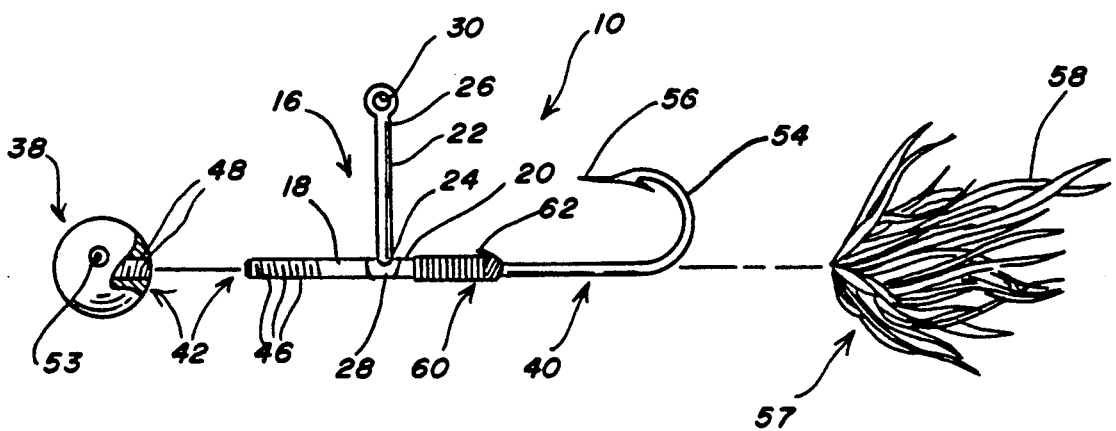
FIG. 2 is an exploded side elevation view of the jigging lure shown in FIG. 1 with sections partially broken away.
Figure 3:
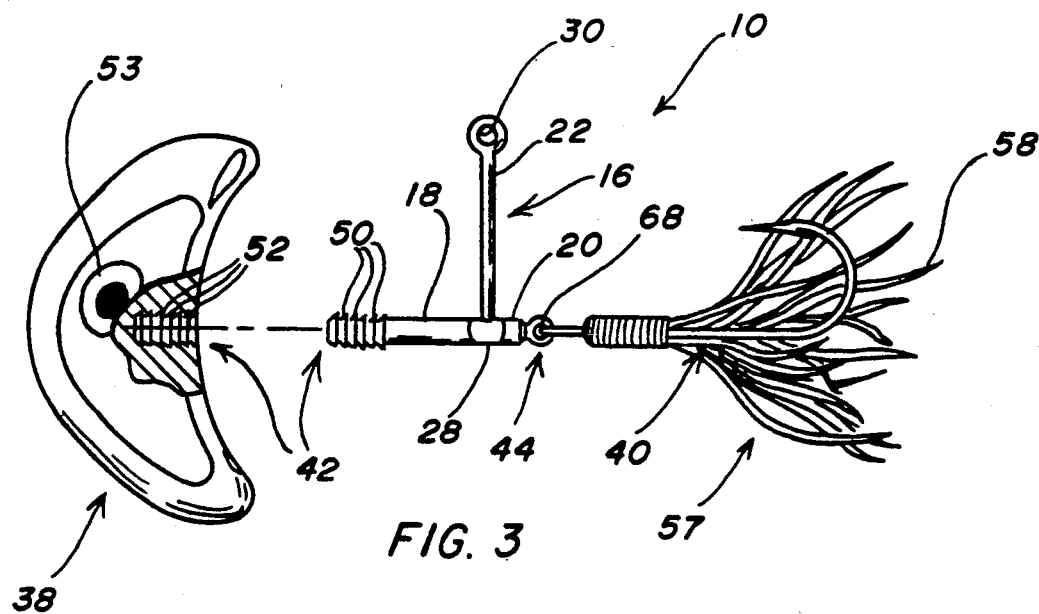
FIG. 3 is a partially exploded side elevation view of a second jigging lure in accordance with the present invention with sections partially broken away; and, FIG. 4 is a perspective view a third jigging lure in accordance with the present invention.

A weighted head 38 is connected to first arm 18 and a barbed end section 40 is connected to second arm 20. A suitable means 42 for attaching the weighted head and a means 44 for attaching the barbed end section are provided. It will be understood that means 42 for connecting the weighted head can take any of a number of forms, two of which are illustrated. As shown in FIG. 2, means 42 for connecting the weighted head provide for detachable connection and comprise mating external and internal threads 46, 48. External threads 46 are formed on first arm 18 and internal threads 48 are formed in weighted head 38 so that weighted head 38 is screwed on the end of first arm 18. As shown in FIG. 3, means 42 for detachably connecting the weighted head comprise mating external and internal grooves or serrations 50, 52. In this instance, weighted head 38 is snapped on the end of first arm 18.

Figure 4:
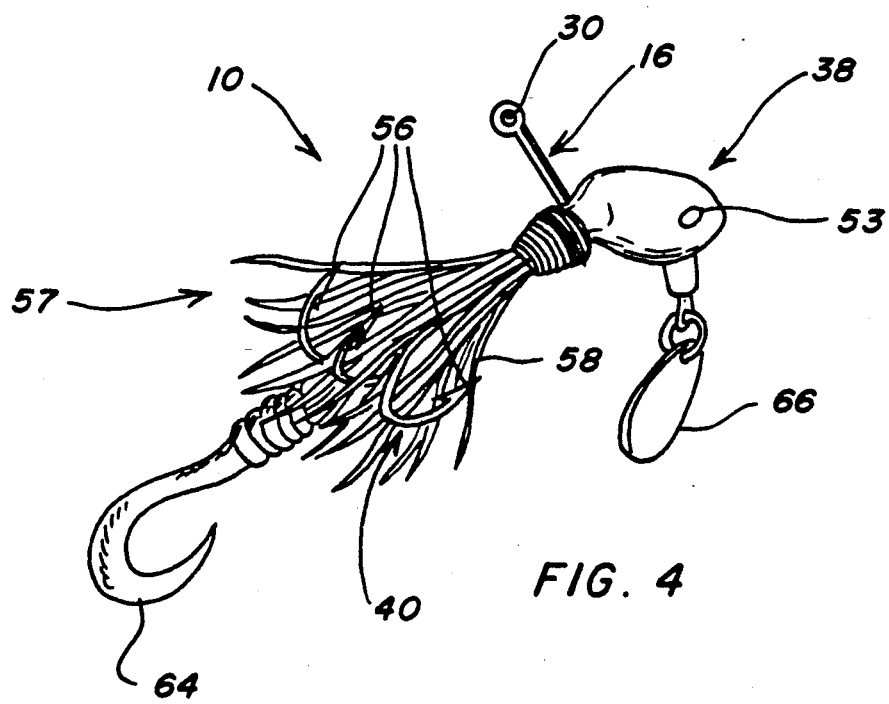

Weighted head 38 can be formed of wood, plastic and so forth to fit the particular fishing conditions and weighted with lead or some other suitable heavy material. It can be round (as shown in FIGS. 1 and 2), bullet shaped (as shown in FIG. 4), coin shaped or the like and decorated with a design such as an eye 53. In other instances, weighted head 38 can take the form of a fish head as shown in FIG. 3 or some other natural bait such as a cricket, frog or the like. Weighted head 38 can be painted in natural or fanciful colors.

Barbed end section 40 resembles in major part a conventional fish hook member and includes an arcuate bend 54 forming the bottom of the hook and a barbed point 56. As shown in FIGS. 1-3, barbed end section has a single barbed point 56. It will be understood, however, that barbed end section 40 can also be made with a plurality of barbed points 56 joined to second arm 20 such as the treble barbed point 56 shown in FIG. 4. It is preferred that barbed end section 40 be integral with second arm 20 in which case means 44 for attaching the barbed end section 40 does not comprise a separate element. In other instances, barbed end section 40 can be screw threaded to second arm 20 or the like.

Barbed point 56 is typically concealed with a dressing 57 such as a tail portion of a fish (not shown) or a skirt 58 of hair, feathers, nylon, rubber or plastic. Means 60 for attaching dressing 57 are provided on second arm 20 such as detent 62 or the like. In some instances, an artificial bait 64 such as a plastic worm or grub (as shown in FIG. 4) or a live bait such as a nightcrawler or cricket may be attached to barbed end section 40 in addition to dressing 57 or as a substitute for dressing 57.

Weighted head 38 and barbed end section 40 are balanced on the end of fishing line 12 about means 28 for connecting the stem. As will be readily understood, balance can be accomplished by selecting the length of arms 18, 20, by selecting the weight of head 38 and by selecting the barbed end section 40 including any dressings and baits attached thereto.

A spinner 66 can be attached to balanced jigging lure 10 as shown in FIG. 4. In addition, jigging lure 10 can be used in a spinner bait (not shown). A spinner bait is a compound lure than incorporates one or more spinner blades with a jig; these are joined at opposite ends of a wire arm so that the lures work independently. Spinner baits can be fished at all depths and are often deadly (from the fish's standpoint) when "buzzed" across the surface.

To further emulate a baitfish, the attachment of weighted head 38 to first arm 18 and of barbed end section 40 to second arm 20 can include an articulated joint 68 as shown in FIG. 3. When the jigging lure includes such a joint, the lure wobbles like a fish swimming through the water and is attractive to larger predatory species.

In use, the fisherman selects a balanced jigging lure 10 suitable for his purpose from his tackle box or constructs one from an appropriate T-shank 16, weighted head 38 and barbed end section 40. Dressing 57 or artificial or live bait are added to barbed end section 40 as desired. It will be apparent that from a moderate number of parts that a large assortment of different jigging lures can be customized.

When balanced jigging lure 10 is cast and retrieved, trolled or jerked up and down vertically, jigging lure 10 sinks quickly to a depth (e.g., 20-40 feet for lake fishing) where fish are more likely to be found and is suspended on fishing line 12 in substantially horizontal position with barbed point 56 facing up. As such, jigging lure 10 is imitative of a baitfish and unlike an ordinary jigging lure which rides head down. In addition, the fisherman is more likely to feel the fish strike barbed end section 40 and be able to respond with a jerk to assist in setting the hook.

In some instances, it may be preferred to balance jigging lure 10 such that it floats weighted head down. In which case, the lure can be bounced along the bottom head down imitating a feeding fish.

T-shaped shank 16 and barbed end section 40 may be stamped out of metal, formed from wire or the like. Weighted head 38 can similarly be made in a number of different ways as will occur to one skilled in the art.

In view of the above, it will be seen that the several objects of the invention are achieved and other advantageous results attained. As various changes could be made in the above constructions without departing from the scope of the invention, it is intended that all matter contained in the above description or shown in accompanying drawings shall be interpreted as illustrative and not in a limiting sense.

What is claimed is:

1. A balanced jigging lure for attachment to a fishing line used by a fisherman to catch a fish comprising:

a T-shaped shank with first and second arms and an elongated stem, said stem having first and second ends, said first end attached to the arms with a means for fixedly connecting the stem to the arms and said second end terminating in an eye, said eye spaced a substantial distance from said first and second arms, said means for connecting the stem to the arms forming a pivot point about which the jigging lure can be suspended b the eye in the stem in substantially horizontal position imitative of a baitfish; and, a weighted head detachably connected to said first arm with means for detachably attaching and a barbed end section connected to the second arm by means for attaching, said weighted head and said barbed end section balanced about the pivot point by selecting the length of the arms, by selecting the weighted head and by selecting the barbed end section including and dressings and baits attached to the barbed end section whereby a large assortment of imitative jigging lures can be formed by interchanging various parts, wherein the means for detachably attaching the weighted head to the first arm comprise external threads on the first arm and mating internal threads in the weighted head.

2. A balanced jigging lure for attachment to a fishing line used by a fisherman to catch a fish comprising:

a T-shaped shank with first and second arms and an elongated stem, said stem having first and second ends, said first end attached to the arms with a means for fixedly connecting the stem to the arm and said second end terminating in an eye, said eye spaced a substantial distance from said first and second arms, said means for connecting the stem to the arms forming a pivot point about which the jigging lure can be suspended by the eye in the stem in substantially horizontal position imitative of a baitfish; and, a weighted head detachably connected to said first arm with means for detachably attaching and a barbed end section connected to the second arm by means for attaching, said weighted head and said barbed end section balanced about the pivot point by selecting the length of the arms, by selecting the weighted head and by selecting the barbed end section including any dressings and baits attached to the barbed end section whereby a large assortment of imitative jigging lures can be formed by interchanging various parts, wherein the means for detachably attaching the weighted head to the first arm comprise external grooves or serrations on the first arm and mating internal grooves or serrations in the weighted head.

3. A balanced jigging lure for attachment to a fishing line used by a fisherman to catch a fish comprising:

a T-shaped shank with first and second arms and an elongated stem, said stem having first and second ends, said first end attached to the arms with a means for fixedly connecting the stem to the arms and said second end terminating in an eye, said eye spaced a substantial distance from said first and second arms, said means for connecting the stem to the arms forming a pivot point about which the jigging lure can be suspended by the eye in the stem in substantially horizontal position imitative of a baitfish; and, a weighted head detachably connected to said first arm with means for detachably attaching and a barbed end section connected to the second arm by means for attaching, said weighted head and said barbed end section balanced about the pivot point by selecting the length of the arms, by selecting the weighted head and by selecting the barbed end section including any dressings and baits attached to the barbed end section whereby a large assortment of imitative jigging lures can be formed by interchanging various parts, wherein the means for detachably attaching the weighted head to the first arm is an articulated joint.

* * * * *